United States Patent
Beausoleil

(10) Patent No.: US 6,938,859 B2
(45) Date of Patent: Sep. 6, 2005

(54) PUSH-ON AND TWIST GAUGE MOUNTING BRACKET

(75) Inventor: Gary Beausoleil, Sterling, CT (US)

(73) Assignee: Thomas G. Faria Corp., Uncasville, CT (US)

( * ) Notice: Subject to any disclaimer, the term of this patent is extended or adjusted under 35 U.S.C. 154(b) by 0 days.

(21) Appl. No.: 10/757,565

(22) Filed: Jan. 15, 2004

(65) Prior Publication Data

US 2004/0159748 A1 Aug. 19, 2004

Related U.S. Application Data

(60) Provisional application No. 60/443,264, filed on Jan. 30, 2003.

(51) Int. Cl.$^7$ .................................................. G12B 9/00
(52) U.S. Cl. ...................... 248/27.1; 248/27.3; 403/371; 403/368; 403/256
(58) Field of Search ................................ 248/27.3, 904, 248/27.1; 73/493, 491; 116/62.1; 403/371, 368, 367, 373, 374.3, 370, 307, 344, 256, 257, 243, 259, 361

(56) References Cited

U.S. PATENT DOCUMENTS

| | | | |
|---|---|---|---|
| 2,187,880 A | * | 1/1940 | Kaysing ...................... 277/625 |
| 2,339,181 A | | 1/1944 | Martin |
| 3,241,794 A | | 3/1966 | Little |
| 3,689,013 A | | 9/1972 | Neugebauer |
| 3,972,547 A | * | 8/1976 | Itoya ........................... 285/341 |
| 4,080,570 A | | 3/1978 | Pearson |
| 4,144,555 A | * | 3/1979 | McGalliard .................. 361/715 |
| 4,508,466 A | * | 4/1985 | Dennis ........................ 403/104 |
| 4,676,533 A | * | 6/1987 | Gerondale ............... 285/139.2 |
| 5,475,577 A | | 12/1995 | Vanderhoof et al. |
| 5,681,058 A | * | 10/1997 | Hwang ..................... 285/133.4 |
| 6,244,107 B1 | | 6/2001 | Nelson et al. |
| 6,467,989 B1 | * | 10/2002 | Finkelstein ................. 403/371 |
| 6,508,192 B2 | * | 1/2003 | Lentine ....................... 114/343 |
| 6,599,049 B2 | | 7/2003 | Erben |

* cited by examiner

Primary Examiner—Kimberly Wood
(74) Attorney, Agent, or Firm—Mark E. Pochal

(57) ABSTRACT

A gauge mounting device (20) for an improved mounting a gauge (17) to an instrument panel (19) including an annular gauge bracket assembly comprised of a gauge bracket having an inner tapering thread profile forming a helical pitch, a gripper ring disposed within the inner tapering thread profile having a plurality of gripping teeth radially aligned on a inner surface of the gripper ring and freely moveable along the inner tapering thread profile. The gauge bracket engaged onto a conical or cylindrical gauge housing having a gauge disposed therein and preventing further rotation of the conical gauge housing forming a stationery helix. The gauge bracket rotated causing forward movement by the helical pitch traveling along the stationery helix from the gripper ring resulting in increasing gripping force applied to the conical or cylindrical gauge housing and increasing sandwiching force between the gauge bracket and the conical or cylindrical gauge housing.

3 Claims, 2 Drawing Sheets

PUSH-ON AND TWIST GAUGE MOUNTING BRACKET

CROSS REFERENCE TO RELATED APLICATIONS

This application is a nonprovisional utility patent application claiming priority of the copending provisional application Ser. No. 60/443,264 filed Jan. 30, 2003.

STATEMENT REGARDING FEDERALLY SPONSORED RESEARCH OR DEVELOPMENT

"Not Applicable"

BACKGROUND OF THE INVENTION

1. Field of the Invention

The present invention relates generally to a gauge mounting device and more particularly, to an apparatus for mounting an instrument gauge, or the like, to an instrument panel of a vehicle, such as an automobile, boat or an airplane. More specifically, the invention is a push-on and twist gauge mounting bracket with an improved locking means for biasing any standard annular gauge housing against the vehicle panel.

2. Description of the Prior Art

Traditionally, a typical method of mounting a gauge to an instrument panel requires an annular gauge housing placed through an aperture in an instrument panel and a mounting bracket attached to the housing from the backside of the instrument panel and a means to sandwich the annular gauge housing to the instrument panel between the annular gauge housing and the mounting bracket.

The most common method for attaching the mounting bracket is the use of mounting studs assembled to the gauge housing and mounting nuts are screwed onto said mounting studs after the mounting bracket, with holes through which the mounting studs pass, is placed over the mounting studs from the backside of the instrument panel.

A second method is by providing a screw thread on the outer wall of the gauge housing and a corresponding screw thread on the inner wall of the mounting bracket and the mounting bracket is screwed onto the housing from the backside of the vehicle panel.

The difficulties associated with these methods of mounting gauges stem from the ergonomic difficulties in the need to screw the bracket the entire length of the gauge housing making for extended assembly time particularly with extended threading on either the mounting studs or gauge housing is required to accommodate various thickness in vehicle panels.

The device disclosed in U.S. Pat. No. 6,244,107 B1 to Nelson et al. issued Jun. 12, 2001 is an example on a mounting device using snap-together elements for engaging the gauge housing and bracket and sandwiching it between the vehicle panel and eliminating the ergonomic difficulties and assembly time required by the traditional mounting methods. This device has the disadvantage of necessitating a specially manufactured gauge housing with a plurality of annular and parallel ribs on the housing to interface with the mounting bracket. The improvement of this invention is that the mounting bracket assembly can be used with various standard gauge housings eliminating the necessity of specially manufactured gauge housings having annular and parallel ribs.

Other patented examples are disclosed in U.S. Pat. No. 6,599,049 B2 to Erben issued Jul. 29, 2003, U.S. Pat. No. 4,080,570 to Pearson issued Mar. 21, 1978. The disadvantage of these devices is the necessity of requiring teeth or threads on the body or housing of the gauge to engage the mounting bracket.

It was with knowledge of the foregoing disclosures representative of the state of the art that the present invention was conceived and has now been reduced to practice.

SUMMARY OF THE INVENTION

The present invention provides a gauge mounting assembly including a annular gauge bracket with a inner tapering thread profile and a gripper ring disposed within said inner tapering thread profile. The gauge disposed in a conical or cylindrical housing is placed in an aperture of a vehicle instrument panel and biased to the said panel by engaging said bracket on said housing causing said gripper ring to engage and provide a increasing sandwiching force on said vehicle instrument panel as the gauge bracket is rotated.

A primary object of the invention, then is to provide an improved device to mount gauges whereby the need for screwing the bracket the entire length of the gauge housing is eliminated by the push-on feature thereby reducing assembly time and the ergonomic difficulties associated with extended screwing time.

A further object of the invention is to provide a gauge bracket assembly that will interface with any standard thermoplastic gauge housing eliminating the need for special threads on the body of the gauge housing.

Still a further object of the invention is to provide s gauge bracket assembly that accommodates variable instrument panel thickness.

Other and further features, advantages, and benefits of the invention will become apparent in the following description taken in conjunction with the following drawings. It is to be understood that the foregoing general description and the following detailed description are exemplary and explanatory but are not restrictive of the invention.

The accompany drawings which are incorporated in and constitute a part of this invention, illustrate one of the embodiments of the invention, and together with the description, serve to explain the principles of the invention in general terms. Like numerals refer to like parts throughout the disclosure. Additional features and advantages of the invention will become apparent with reference to the drawings which form a part of this specification. It is therefore, to be understood that within the appended claims, wherein reference numerals are merely for convenience and are not to be in any way limiting, the invention may be practiced otherwise then as specifically described.

DETAILED DESCRIPTION OF THE PREFERRED EMBODIMENT

Figure 1:
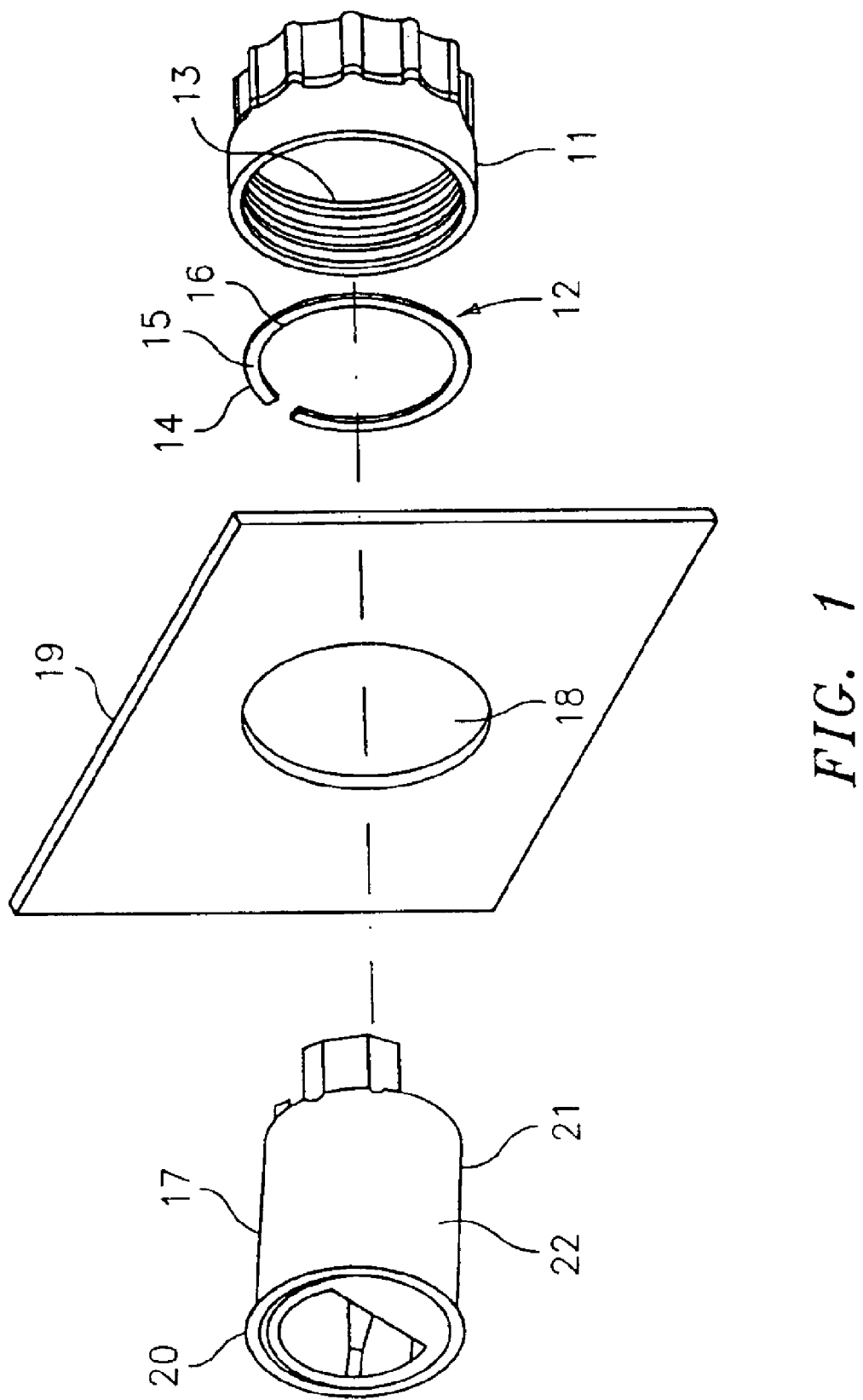
FIG. 1. is a exploded view of the gauge mounting assembly.
Figure 2:
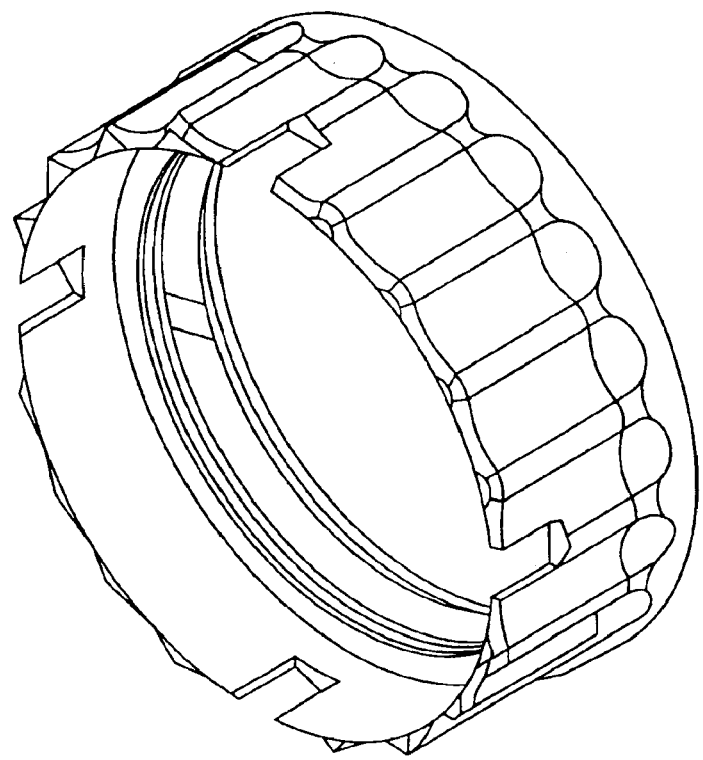
FIG. 2. is a perspective view of the bracket and inner annular tapering threaded profile that houses the gripper ring.
Figure 3:
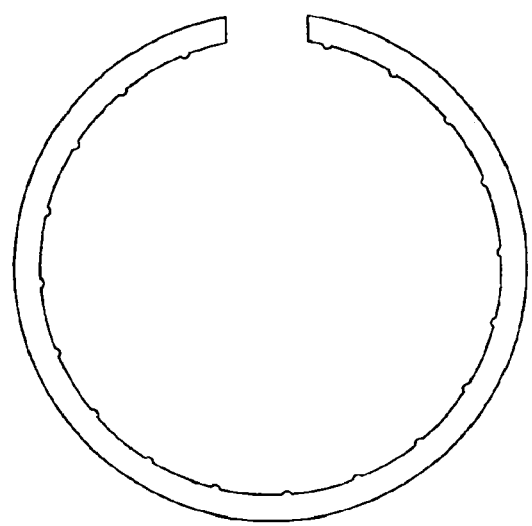
FIG. 3. is a perspective view of the gripper ring.

Referring to FIG. 1, wherein like numerals indicate like corresponding parts throughout the several views, a push-on and twist gauge mounting device (20) for mounting a gauge (17) to an instrument panel (19) of a vehicle consisting of a gauge bracket (11) and a gauge gripper ring (12). The gauge bracket (11), in the preferred embodiment, is manufactured from a thermoplastic material, includes an inner annular tapering thread profile (13). The gauge gripper ring (12), in the preferred embodiment, is manufactured from a thin metal of spring temper and is discontinuous. Said gauge gripper ring (12) has a smooth outer surface (14) and an inner surface (15) having a plurality of gripping teeth (16) radially aligned around said inner surface (15). Said gauge gripper ring (12) is disposed within said inner annular tapering thread profile (13) of said gauge bracket (11) and is free to travel axially along the helix of said inner annular tapering thread profile (13). A gauge (17) is disposed within a gauge housing (21) having a conical or cylindrical body (22). Said gauge housing (21) is placed through a aperture (18) and biased to said instrument panel (19). Said gauge bracket (11) is engaged to said conical or cylindrical body (22) whereby said gripping teeth (16) engage and prevent said gripper ring (12) from rotating and forming a stationary helix. As said gauge bracket (11) is rotated, it is driven forward by the helical pitch of said inner annular tapering thread profile (13) traveling along said stationary helix resulting in said gauge bracket (11) becoming increasing tighter on said conical or cylindrical body (22) of said gauge housing (21) and increasing sandwiching force on said instrument panel (19) providing a secure attachment of gauge (17) to instrument panel (19).

What is claimed is:

1. A gauge mounting device for mounting a gauge disposed in an annular gauge housing having a conical or cylindrical body positioned through an aperture in an instrument panel, said gauge mounting device comprising:
    (a) a gripper ring having an outer smooth annular surface and an inner surface having a plurality of gripping teeth radially aligned thereon;
    (b) a gauge bracket having an inner tapering thread profile;
    (c) said gauge bracket having disposed within said thread profile said outer surface of said gripper ring which is freely moveable axially along said thread profile;
    (d) said gauge bracket when positioned about said gauge housing causing said plurality of gripping teeth to become frictionally engaged around said gauge housing preventing further rotation of said gripper ring forming a stationery helix;
    (e) said gauge bracket with rotation causing forward movement along the said tapering thread profile about said stationary helix formed by said gripper ring causing an increasing frictional force to said gauge housing and an increasing sandwiching force biasing said gauge bracket to said instrument panel.

2. The gripper ring as claimed in claim 1, wherein said gripper ring is discontinuous and able to move freely axially along said helix of said inner tapering thread profile and able to configure to said inner tapering thread profile.

3. The gripper ring as claimed in claim 1, wherein said gripper ring is made of a material of thin metal having a spring temper.

* * * * *